United States Patent [19]

Yamada

[11] Patent Number: 4,896,233
[45] Date of Patent: Jan. 23, 1990

[54] HEAD SUPPORTING MECHANISM FOR A MAGNETIC DISK APPARATUS IN WHICH A HEAD SLIDER IS INCLINED WITH RESPECT TO A GIMBAL SPRING

[75] Inventor: Tadaharu Yamada, Tokyo, Japan

[73] Assignee: NEC Corporation, Tokyo, Japan

[21] Appl. No.: 155,418

[22] Filed: Feb. 12, 1988

[30] Foreign Application Priority Data

Feb. 12, 1987 [JP] Japan ..................... 62-30923

[51] Int. Cl.$^4$ ............................. G11B 5/48
[52] U.S. Cl. ................... 360/104; 360/103; 360/106
[58] Field of Search ............. 360/102, 103, 104, 105, 360/106

[56] References Cited

U.S. PATENT DOCUMENTS

| | | | |
|---|---|---|---|
| 3,823,416 | 7/1974 | Warner | 360/122 X |
| 4,150,407 | 4/1979 | Dijkstra | 360/106 |
| 4,346,416 | 8/1982 | Riggle et al. | 360/106 |
| 4,764,829 | 8/1988 | Makino | 360/106 |
| 4,775,907 | 10/1988 | Shtipelman | 360/106 |
| 4,783,710 | 11/1988 | Salyer et al. | 360/104 |

*Primary Examiner*—Robert S. Tupper
*Assistant Examiner*—Andrew L. Sniezek
*Attorney, Agent, or Firm*—Sughrue, Mion, Zinn, Macpeak & Seas

[57] ABSTRACT

A head slider supporting mechanism for supporting a head slider to float on a surface of a magnetic disk when the magnetic disk is rotating. The head slider supporting mechanism includes a rigid arm block and a suspension element secured to the rigid arm block at its fixed end, the suspension element having a resilient spring section adjacent the fixed end and a rigid load beam section adjacent a free end thereof so as to apply a loading force at the free end. A gimbal spring symmetric with a symmetric axis is secured to the free end of the suspension element, the gimbal spring mounting the head slider to enable the head slider to move in rolling and pitching directions. The end slider is mounted on the gimbal spring such that its longitudinal axis is inclined relative to the symmetric axis of the gimbal spring by an angle ranging from more than 10° but less than 80°.

8 Claims, 5 Drawing Sheets

HEAD SUPPORTING MECHANISM FOR A MAGNETIC DISK APPARATUS IN WHICH A HEAD SLIDER IS INCLINED WITH RESPECT TO A GIMBAL SPRING

BACKGROUND OF THE INVENTION

The present invention relates to a head slider supporting mechanism for a magnetic disk apparatus.

A head slider supporting mechanism installed in a magnetic disk apparatus includes a suspension which holds a head slider and a head arm to which the suspension is mounted. The suspension has to be flexible in order to urge the head slider against the surface of a rigid or a flexible rotating magnetic disk by an adequate load and to allow the head slider to follow the changing topography of disk surface.

To meet the above requirement, a conventional head slider supporting mechanism is provided with a suspension element which is mounted on a rigid arm block, as disclosed in U.S. Pat. No. 4,167,765. The suspension element includes a load beam section having flanges at both sides thereof and a resilient spring section adapted to provide the load beam section with resiliency. A gimbal spring is welded to the tip of the suspension element in order to hold a head slider. The gimbal spring includes two flexible outer fingers which are parallel to each other in the longitudinal direction of the suspension element and a center tongue to which the head slider is fastened by adhesive. The center tongue is provided with a semispherical protuberance at its intermediate portion and free at one of its opposite ends. The head slider is fastened to the center tongue of the gimbal spring such that the longitudinal direction of floating surfaces of two side rails of the head slider are perpendicular to the longitudinal axis of the suspension element, i.e. that of the gimbal spring.

The head slider is required to roll about its longitudinal axis and to pitch about an axis which is perpendicular to the longitudinal axis so as to follow the surface of the magnetic disk. In the conventional head slider supporting mechanism, however, it is difficult to enable the head slider to follow the circumferential changing topography of the disk surface with high accuracy. This is because while the rigidity of the head slider in the longitudinal direction (rolling direction) is as low as 30 gf-mm/rad, the rigidity in the direction perpendicular to the longitudinal direction (pitching direction) is as high as 65 gf-mm/rad which is more than double the former.

In another conventional head slider supporting mechanism, the longitudinal axis of the suspension element, i.e., that of the gimbal spring and the longitudinal axis of the head slider are substantially aligned with each other as described in U.S. Pat. No. 4,620,251. This kind of mechanism suffers from a drawback that, contrary to the first-mentioned conventional mechanism, the rigidity in the rolling direction is far greater than the rigidity in the pitching direction, preventing the head slider from accurately following radial changing topography of the disk surface.

U.S. Pat. No. 4,486,798 teaches a head slider supporting mechanism in which the head slider is located with its longitudinal axis angled by 4 degrees to 10 degrees relative to the axis which is perpendicular to the longitudinal axis of the suspension element. In this structure, the head slider is provided with a certain skew angle relative to all concentric tracks which are provided on the magnetic disk so that damage (head crash) to an electromagnetic transducer of the head slider, the suspension element and the disk surface due to dust may be reduced. Even in such a mechanism, the rigidity in the rolling direction is far greater than that in the pitching direction and, hence, the head slider fails to follow the changing topography of the disk surface with high accuracy.

SUMMARY OF THE INVENTION

It is, therefore, an object of the present invention to provide a head slider supporting mechanism which allows a head slider to follow the changing topography of the surface of a magnetic disk with high accuracy.

It is another object of the present invention to provide a head slider supporting mechanism which enable a head slider to have substantially the same flexibility in both the rolling and pitching directions.

A head slider supporting mechanism in accordance with the present invention includes a head slider provided with an electromagnetic transducer and flying or sliding on a surface of a magnetic disk, and a suspension element which holds the head slider on the disk surface. The longitudinal axis of the head slider is inclined by greater than 10 degrees and smaller than 80 degrees relative to that of the suspension element.

BRIEF DESCRIPTION OF THE DRAWINGS

The above and other objects, features and advantages of the present invention will become more apparent from the following detailed description taken in conjunction with the accompanying drawings in which.

In the drawings, the same or similar structural elements are designated by the same or similar reference numerals.

DESCRIPTION OF THE PREFERRED EMBODIMENTS

Figure 1:
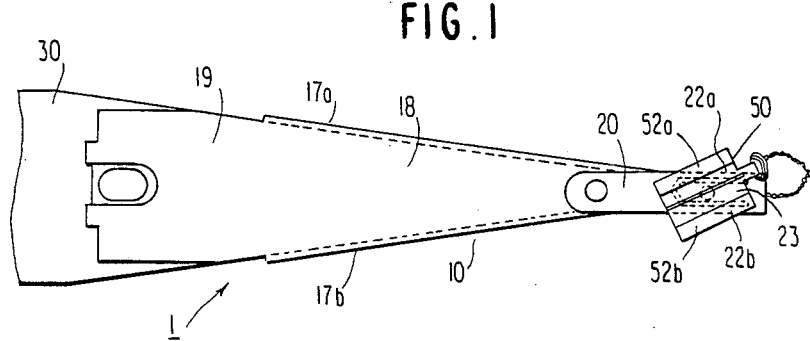
FIG. 1 is a plan view showing a first embodiment of the present invention.
Figure 2:
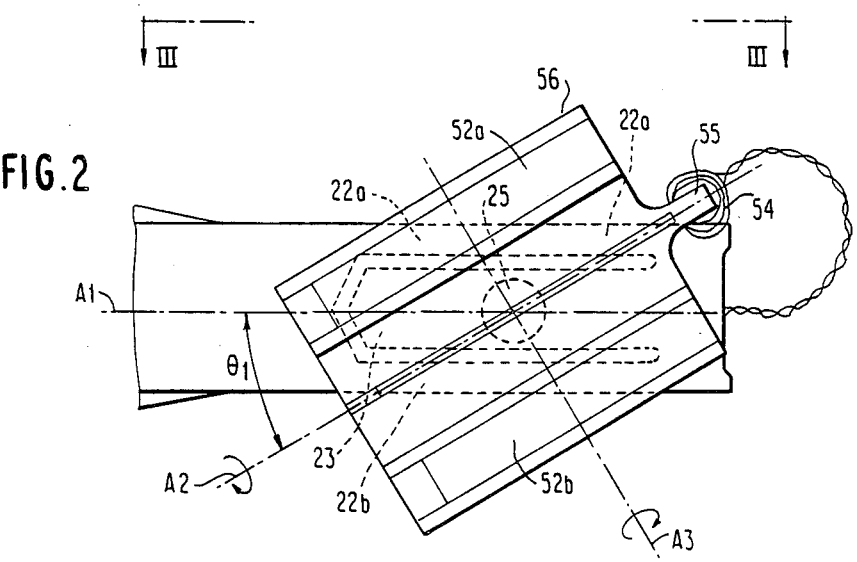
FIG. 2 is a fragmentary enlarged plan view of the first embodiment shown in FIG. 1.
Figure 3:
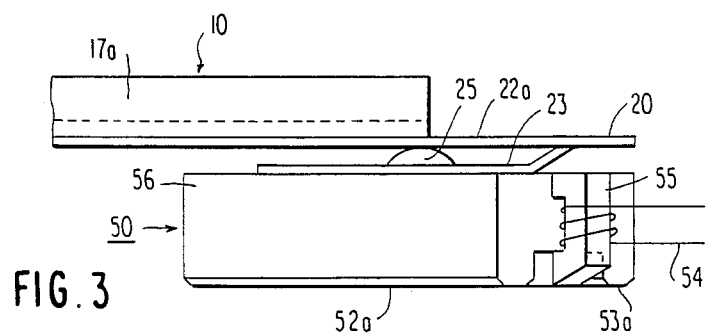
FIG. 3 is a side elevation view of the first embodiment shown in FIG. 2 as seen in a direction III—III.

Referring to FIGS. 1 to 3, a first embodiment of the present invention includes a suspension element 10 one end of which is welded to a rigid arm block 30. The suspension element 10 is made up of a rigid load beam section 18 which is provided with flanges 17a and 17b at both sides thereof and a resilient spring section 19 for applying a loading force at the other end. A gimbal spring 20 adapted to hold a head slider 50 is welded to the other end of the suspension element 10. The longitudinal axis A1 of the suspension element 10 and that of the gimbal spring 20 are aligned with each other. The gimbal spring 20 includes two flexible outer fingers 22a and 22b which extend parallel to each other in the longitudinal direction of the suspension element 10, and a center tongue 23 to which the head slider 50 is fastened. The gimbal spring 20 is symmetric with respect to the longitudinal axis A1, which may be referred to as the "symmetric axis" herein after. The center tongue 23 is provided with a semispherical protuberance 25 at its intermediate portion and free at one end. The struecture described above is disclosed in more detail in U.S. Pat. No. 4,167,765 or U.S. patent application Ser. No. 700,202 filed Feb. 11, 1985 and assigned to the same assignee.

The head slider 50 is implemented with a Winchester type head slider having a C-shaped core portion 55, a floating slider section 56 which are made of ferrite and a winding 54 provided around the core portion 55. For details of such a head slider configuration, reference may be made to U.S. Pat. No. 3,823,416. The head slider 50 has an axis A2 which extends parallel to the longitudinal direction of two floating surfaces 52a and 52b of the head slider 50. The head slider 50 is fastened to the center tongue 23 of the gimbal spring 20 with the axis A2 inclined by an angle of $v_1$ which is 18.5 degrees relative to a longitudinal axis A1 of the suspension element 10, i.e., the symmetric axis of the gimbal spring 20.

Since the longitudinal axis A2 of the head slider 50 is angled by 18.5 degrees relative to the axis A1 of the suspension element 10, i.e., the symmetric axis of the gimbal spring 20, as stated above, the rigidity of the head slider 50 around the axis A2 (in the rolling direction) is 60 gf-mm/rad while the rigidity around an axis A3 which is perpendicular to the axis A2 (in the pitching direction) is 35 gf-mm/rad. Hence, the difference in rigidity between the rolling and pitching directions becomes small enough to allow the head slider 50 to follow any changing topography of the disk surface with high accuracy.

Figure 4:
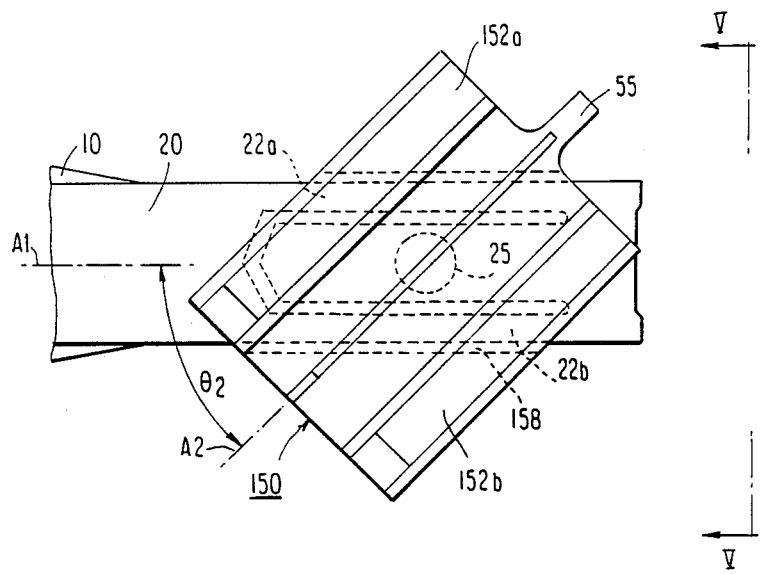
FIG. 4 is a plan view showing a second embodiment of the invention.
Figure 5:
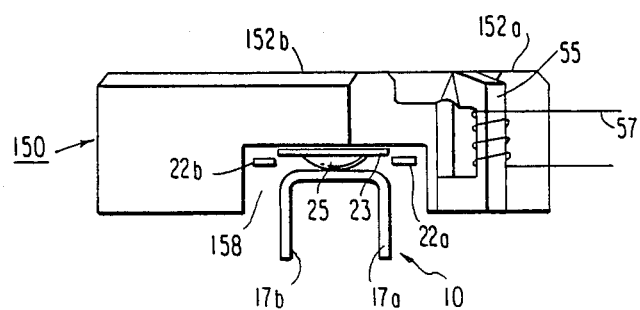
FIG. 5 is a side elevation view of the second embodiment shown in FIG. 4 as seen in a direction V—V.

Referring to FIGS. 4 and 5, a second embodiment of the present invention is shown which is also applied to a Winchester type head slider. In this embodiment, a head slider 150 is adhered to the center tongue 23 of the gimbal spring 20 at an angle 82 which is 45 degrees relative to the longitudinal axis $\theta_1$ of the suepension element 10. With such a configuration, the head slider 150 achieves rigidity of 47 gf-mm/rad both in the rolling and pitching directions and, therefore, the same degree of flexibility in the two different directions.

The head slider 150 is provided with a groove 158 on its surface which is opposite to floating surfaces 152a and 152b. The groove 158 extends parallel to the longitudinal axis A1 of the suspension element 10. As best shown in FIG. 5, the end of the suspension element 10 and the gimbal spring 20 are located in the groove 158. This structure advantageously reduces the whole thickness of the mechanism including the suspension element 10, gimbal spring 20 and head slider 150 which is to be positioned in an interplate spacing between magnetic disks, compared with the structure of the first embodiment. Consequently, the interplate spacing of magnetic disks and, therefore, the overall thickness of a magnetic disk apparatus can be reduced.

Figure 6:
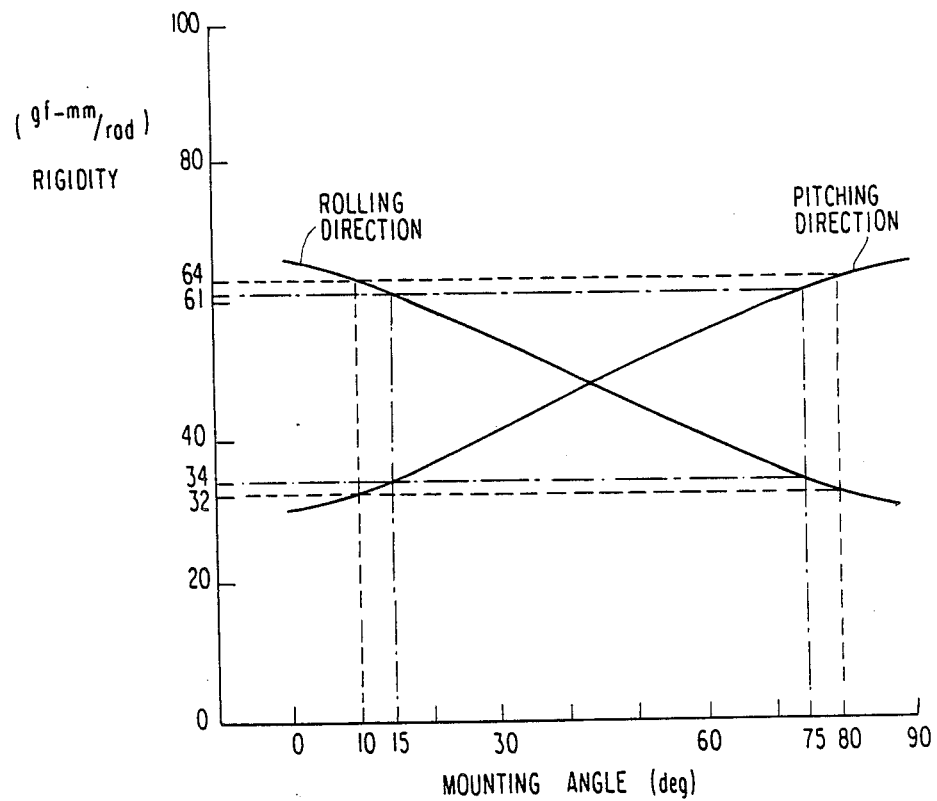
FIG. 6 is a graph representative of a relationship between the mounting angle of a head slider and the rigidity in the rolling and pitching directions of the same.

FIG. 6 is a graph showing how the rigidity of the head slider 50 or 150 varies in the rolling and pitching directions with the angle between the axis A1 of the suspension element 10, i.e., the symmetric axis of the gimbal spring 20, and the longitudinal axis A2 of the head slider 50 or 150. A series of experiments showed that the above-mentioned angle should advantageously be greater than 10 degrees and smaller than 80 degrees.

When the angle of the head slider is 10 degrees, the rigidity is approximately 64 gf-mm/rad in the rolling direction and approximately 32 gf-mm/rad in the pitching direction, i.e., the former is about double the latter. This is substantially the upper limit of ratio in rigidity between the rolling and pitching directions which allows the head slider to accurately follow the circumferential and radial changing topography of the disk surface. As the angle of the head slider is 10 degrees or less than 10 degrees, the rigidity in the rolling direction becomes so great that the following characteristic of the head slider is degraded.

When the angle of the head slider is 80 degrees, the rigidity is approximately 32 gf-mm/rad in the rolling direction and approximately 64 gf-mm/rad in the pitching direction, i.e., the former is about one half the latter. This is substantially the lower limit of ratio in rigidity between the rolling and pitching directions which allows the head slider to accurately follow the circumferential and radial changing topography of the disk surface. As the angle is 80 degrees or greater than 80 degrees, the rigidity in the pitching direction would become excessively great degrading the following characteristic of the head slider.

As understood from the above, the angle of the head slider, which prevents one of the rigidity in the rolling direction and that in the pitching direction from becoming double or more than double the other, ranges greater than 10 degrees and smaller than 80 degrees, i.e., at least in the range of 11 degrees to 79 degrees, and more favorably the range of 15 degrees to 75 degrees.

It should be noted that the head slider of the conventional head slider supporting mechanism disclosed in previously mentioned U.S. Pat. No. 4,486,798 is inclined by 4 degrees to 10 degrees relative to the axis which is perpendicular to the longitudinal axis of the suspension element. This range of angles is equal to 80 degrees to 86 degrees in terms of the angle relative to the longitudinal axis of the suspension element. Such a range does not lie in the previously mentioned one in which the head slider follows the changing topography of the disk surface with high accuracy.

Figure 7:
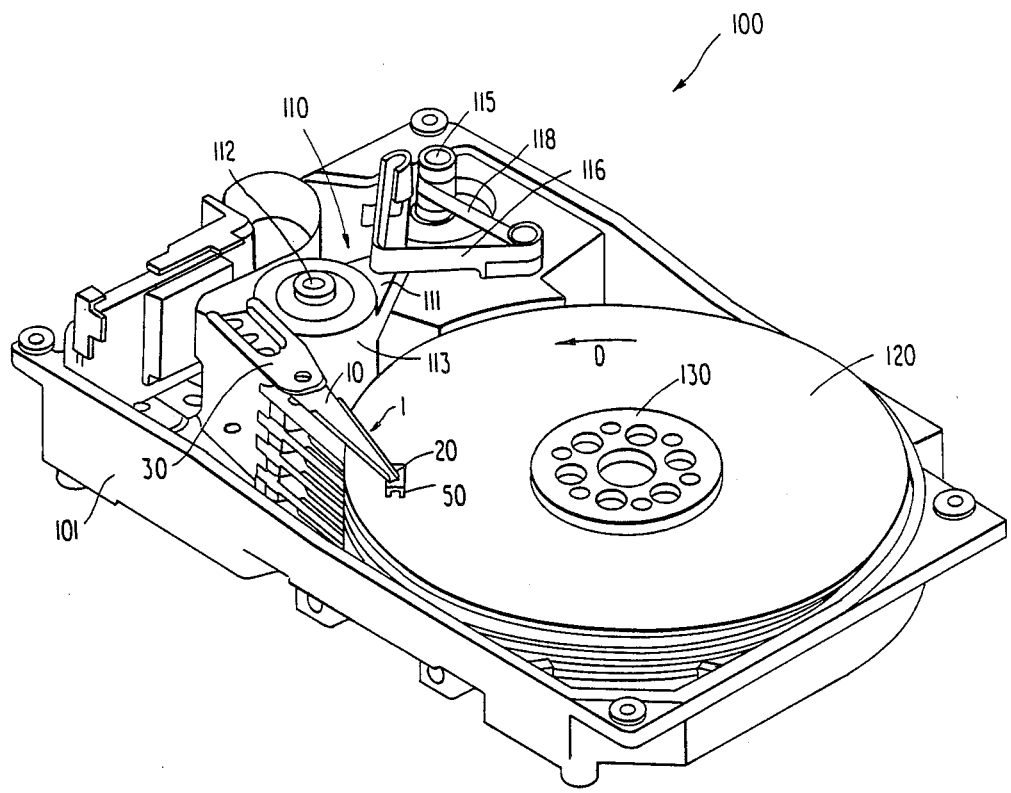
FIGS. 7 and 8 are a perspective and a plan view showing a magnetic disk apparatus which is provided with the first embodiment of the present invention.
Figure 8:
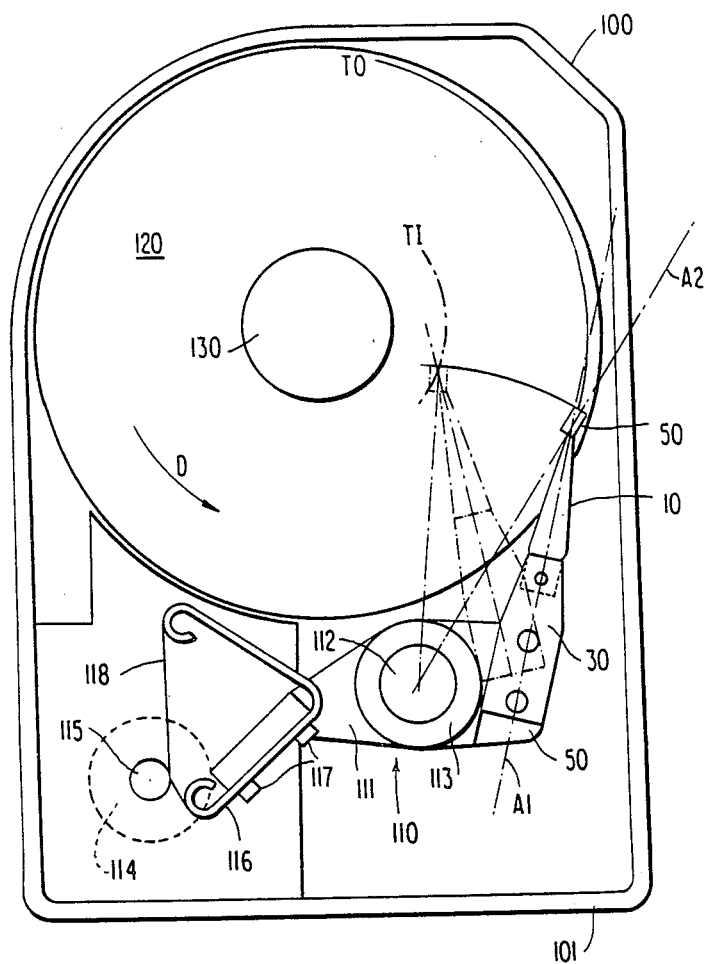

Referring to FIGS. 7 and 8, a magnetic disk apparatus 100 which is provided with the first embodiment of the present invention includes a plurality of head slider supporting mechanisms 1, a positioning mechanism 110 for positioning the head sliders 50 of the head slider supporting mechanisms 1 at a destination track of respective magnetic disks 120 which are associated with the head slider 50, and a spindle 130 on which the disks 120 are mounted at predetermined intervals. The spindle 130 is driven by a spindle motor (not shown) to rotate the disks 120 in a direction indicated by an arrow D.

The positioning mechanism 110 includes a rotary block 113 which is rotatably mounted on a frame 101 about a shaft 112. Each of the head slider supporting mechanism 1 is fixed to the arm block 30. The arm block 30 and an extension arm 111 are securely provided on the rotary block 113. The positioning mechanism 110 further includes a rotary motor 114 (FIG. 8) which is located outside of the frame 101 and has an drive shaft 115 protruding into the frame 101. A generally V-shaped spring plate 116 is fastened at one arm thereof to the extension arm 111 by screws 117 (FIG. 8). A belt 118 made of stainless steel is fixed to the drive shaft 115 at its intermediate portion and wound therearound by a single turn. Opposite ends of the belt 118 are individually welded to those of the spring plate 116. The spring plate 116 constantly applies tension to the belt 118. The belt 118 may be implement with substantially the same belt as one disclosed in Japanese Patent Disclosure No. 51678/1986, the belt having a generally Z shape when unstressed.

In operation, when the rotary motor 114 rotates, it in turn drives the block 113 in a rotary motion about the axis of the shaft 112 until one of the head sliders 50 is positioned at a destination track of the corresponding magnetic disk 120. In FIG. 8, the positioning mechanism 110 is capable of moving the head slider 50 over the range between an outermost track TO and an innermost track TI, as represented by a solid line and a two dots and dashed line, respectifely.

Since the head slider 50 is inclined by the previously mentioned angle relative to the suepension element 10, a major part of the suspension element 10 does not overlie the magnetic disk 120 when the head slider 50 is positioned at the outermost track TO as indicated by the solid line. Further, the suspension element 10 and the tip of the arm block 30 are prevented from overlying the disk 120 except for a small area thereof even when the head slider 50 is positioned at the innermost track TI as indicated by the two dots and dashed line. For these reasons, the reduction in thickness of only the tip of the arm block 30 enables the interplate spacing of the disks 120 and, thereby, the overall thickness of the apparatus 100 to decrease. As shown in FIG. 8, the axis A2 of the head slider 50 extends through the rotational axis of the block 113. Further, the yaw angle of the head slider 50, i.e., the angle between the axis A2 and the lines which are tangential to the concentric tracks of the disk 120 is zero at the intermediate track between the outermost and innermost tracks. In addition, the yaw angle mentioned above is smaller than 15 degrees even at the outermost and innermost tracks.

While the foregoing embodiments have concentrated on a supporting mechanism for a head slider of the type flying on the surface of a magnetic disk at a constant flying height, the present invention is similarly applicable to a head slider supporting mechanism for a head slider of the type contacting the surface of a floppy disk.

In summary, it will be seen that in accordance with the present invention the longitudinal axis of a head slider and that of a suspension element which supports the head slider are inclined relative to each other by an angle which is greater than 10 degrees and smaller than 80 degrees. This reduces a difference between the flexibility in the pitching direction and that in the rolling direction of the head slider, thereby realizing a head slider supporting mechanism enabling the head slider to follow the changing topography of the surface of a magnetic disk with high accuracy.

Another advantage attainable with the above constuction is that the spacing between disks can be reduced to promote high-density disk loading.

Although the invention has been described with the preferred embodiments, various alternatives and modifications thereto can be made within the scope of the appended claims.

What is claimed is:

1. A head slider supporting mechanism for supporting a head slider so as to float on a surface of a magnetic disk when said magnetic disk is rotating, comprising:
    a rigid arm block;
    a suspension element secured to said rigid arm block at its fixed end, said suspension element including a resilient spring section adjacent to said fixed end and a rigid load beam section adjacent to a free end of said suspension element so as to apply a loading force at said free end; and
    a gimbal spring symmetric with respect to a symmetric axis, said gimbal spring being secured to said free end of said suspension element such that one end portion of said gimbal spring including one end of said symmetric axis is secured to said free end of said suspension element, said gimbal spring mounting said head slider so as to enable said head slider to move in rolling and pitching directions;
    said head slider being formed with rails parallel to each other on a surface facing said magnetic disk, said head slider having a longitudinal axis parallel to an extending direction of said rails and being mounted on said gimbal spring such that said longitudinal axis is inclined relative to said symmetric axis of said gimbal spring by an angle ranging from greater than 10 degrees to smaller than 80 degrees.

2. The head slider supporting mechanism as claimed in claim 1, wherein a difference between rigidity of said head slider around said longitudinal axis and rigidity around an axis perpendicular to said longitudinal axis is less than double the other.

3. The head slider supporting mechanism as claimed in claim 1, wherein said angle between said longitudinal axis of said head slider and said symmetric axis of said gimbal spring is about 18.5 degrees.

4. The head slider supporting mechanism as claimed in claim 1, wherein said head slider is provided with a groove on that surface of said head slider which is opposite to a surface which faces said magnetic disk, said suspension element being located in said groove.

5. A magnetic disk apparatus comprising:
    a magnetic disk rotatably mounted on said apparatus;
    a head slider supporting mechanism for supporting a head slider provided with an electromagnetic transducer so as to float on a surface of said magnetic disk when said magnetic disk is rotating, said head slider supporting mechanism including a rigid arm block a suspension element secured to said rigid arm block at its fixed end, said suspension element including a resilient spring section adjacent to said fixed end a rigid load beam section adjacent to a free end of said suspension element so as to apply a loading force at said free end; and a gimbal spring symmetric with respect to a symmetric axis, said gimbal spring being secured to said free end of said suspension element such that one end portion of said gimbal spring including one end of said symmetric axis is secured to said free end of said suspension element, said gimbal spring mounting said head slider so as to enable said head slider to move in rolling and pitching directions; said head slider being formed with rails parallel to each other on a surface facing said magnetic disk, said head slider having a longitudinal axis parallel to an extending direction of said rails and being mounted on said gimbal spring such that said longitudinal axis is inclined to relative of said symmetric axis of said gimbal spring by an angle ranging from greater than 10 degrees to smaller than 80 degrees; and
    a positioning mechanism for driving said head slider supporting mechanism to rotate about a rotational axis and for positioning said electromagnetic transducer of said head slider at a destination track of said magnetic disk.

6. The magnetic disk apparatus as claimed in claim 5, wherein an extensior of said longitudinal axis of said head slider extends through said rotational axis of said positioning mechanism.

7. The magnetic disk apparatus as claimed in claim 5, wherein said longitudinal axis of said head slider is inclined by 18.5 degrees relative to said symmetric axis of said gimbal spring.

8. The magnetic disk apparatus as claimed in claim 5, wherein a yaw angle between said longitudinal axis of said head slider and lines which are tangential to individual tracks of said magnetic disk is smaller than 15 degrees.

* * * * *

UNITED STATES PATENT AND TRADEMARK OFFICE
CERTIFICATE OF CORRECTION

PATENT NO. : 4,896,233
DATED : January 23, 1990
INVENTOR(S) : Tadaharu YAMADA

It is certified that error appears in the above-identified patent and that said Letters Patent is hereby corrected as shown below:

Col. 3, line 7, delete "struecture" and insert --structure--;

Col. 3, line 17, after "3,823,416." insert --As is well known in the art, such a head slider is designed to fly or float on the surface of a magnetic disk when the magnetic disk is rotating.--

Col. 3, line 19, after "52b" insert --of longitudinal rails--;

Col. 3, line 22, delete "$v_1$" and insert --$\emptyset_2$--

Col. 3, line 41, delete "82" and insert --$\emptyset_1$--;

Col. 3, line 42, delete "$0_1$" and insert --A1--;

Col 3, line 42, delete "suepension" and insert --suspension--;

Col. 3, line 43, after "10" insert --, i.e., the symmetric axis of the gimbal spring 20--;

Col. 5, line 15, delete "respectifely" and insert --respectively--;

Col. 7, line 2, delete "extensior" and insert --an extension line--;

UNITED STATES PATENT AND TRADEMARK OFFICE
CERTIFICATE OF CORRECTION

PATENT NO. : 4,896,233

DATED : January 23, 1990

INVENTOR(S) : Tadaharu YAMADA

It is certified that error appears in the above-identified patent and that said Letters Patent is hereby corrected as shown below:

Col. 7, line 3, delete "extends" and insert --passes--

Signed and Sealed this

Sixteenth Day of April, 1991

*Attest:*

HARRY F. MANBECK, JR.

*Attesting Officer*    *Commissioner of Patents and Trademarks*